(12) United States Patent
Kobayashi (10) Patent No.: US 10,240,512 B2
(45) Date of Patent: Mar. 26, 2019

(54) RANKINE CYCLE SYSTEM (71) Applicant: TOYOTA JIDOSHA KABUSHIKI KAISHA, Toyota-shi, Aichi-ken (JP)

(72) Inventor: Hideo Kobayashi, Mishima (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 82 days.

(21) Appl. No.: 15/328,158

(22) PCT Filed: Jul. 14, 2015

(86) PCT No.: PCT/JP2015/070126
§ 371 (c)(1),
(2) Date: Jan. 23, 2017

(87) PCT Pub. No.: WO2016/021375
PCT Pub. Date: Feb. 11, 2016

(65) Prior Publication Data
US 2017/0204775 A1   Jul. 20, 2017

(30) Foreign Application Priority Data
Aug. 4, 2014   (JP) .................. 2014-159039

(51) Int. Cl.
| | |
|---|---|
| *F01P 7/16* | (2006.01) |
| *F01P 3/22* | (2006.01) |
| *F01P 5/10* | (2006.01) |
| *F01P 9/06* | (2006.01) |
| *F02G 5/02* | (2006.01) |
| *F01N 5/02* | (2006.01) |
| *F01K 23/06* | (2006.01) |
| *F01K 23/10* | (2006.01) |
| *F02G 5/04* | (2006.01) |
| *F01N 3/02* | (2006.01) |
| *F01P 7/14* | (2006.01) |

(52) U.S. Cl.
CPC .............. *F01P 7/16* (2013.01); *F01K 23/065* (2013.01); *F01K 23/10* (2013.01); *F01N 3/0205* (2013.01); *F01N 5/02* (2013.01); *F01P 3/22* (2013.01); *F01P 5/10* (2013.01); *F01P 9/06* (2013.01); *F02G 5/02* (2013.01); *F02G 5/04* (2013.01); *F01P 2003/2214* (2013.01); *F01P 2003/2264* (2013.01); *F01P 2005/105* (2013.01); *F01P 2007/146* (2013.01); *Y02T 10/166* (2013.01)

(58) Field of Classification Search
CPC ........ F01P 7/16; F01P 3/22; F01P 5/10; F01P 9/06; F01P 2003/2214; F01P 2007/146; F01P 2060/14; F02G 5/02; F02G 5/04
USPC ........... 123/41.08, 41.19, 41.2, 41.21, 41.26; 237/12.3 R
See application file for complete search history.

(56) References Cited

U.S. PATENT DOCUMENTS

| | | | |
|---|---|---|---|
| 2010/0071637 A1 | 3/2010 | Shintani et al. | |
| 2013/0008165 A1* | 1/2013 | Yamada | F01K 9/00 60/671 |

FOREIGN PATENT DOCUMENTS

| | | |
|---|---|---|
| CN | 101589212 A | 11/2009 |
| JP | 2008-169760 A | 7/2008 |

(Continued)

*Primary Examiner* — Syed O Hasan
(74) *Attorney, Agent, or Firm* — Sughrue Mion, PLLC (57) ABSTRACT

A rankine cycle system includes: an internal combustion engine; a gas-liquid separator; a first pump; a steam generator; a superheater; an expander; a condenser; a first control valve; and a controller.

2 Claims, 5 Drawing Sheets

(56) References Cited

FOREIGN PATENT DOCUMENTS

| JP | 2009-191625 A | | 8/2009 |
|----|---------------|---|--------|
| JP | 2009191625 | * | 8/2009 |
| JP | 2010-223116 A | | 10/2010 |
| JP | 2012-149539 A | | 8/2012 |
| JP | 2012149539 | * | 8/2012 |

* cited by examiner

RANKINE CYCLE SYSTEM

CROSS REFERENCE TO RELATED APPLICATIONS

This application is a National Stage of International Application No. PCT/JP2015/070126 filed Jul. 14, 2015, claiming priority based on Japanese Patent Application No. 2014-159039, filed Aug. 4, 2014, the contents of all of which are incorporated herein by reference in their entirety.

TECHNICAL FIELD

The present invention is related to a rankine cycle system.

BACKGROUND ART

Patent Documents 1 and 2 disclose a rankine cycle system that utilizes a refrigerant for cooling an internal combustion engine. For example, such a rankine cycle system includes: the internal combustion engine cooled by a refrigerant circulating therethrough; a gas-liquid separator; a first pump that supplies a refrigerant from the internal combustion engine to the gas-liquid separator, and supplies a liquid-phase refrigerant from the gas-liquid separator to the internal combustion engine again; a steam generator that transfers waste heat from the internal combustion engine to a liquid-phase refrigerant supplied from the gas-liquid separator, and supplies a refrigerant to the gas-liquid separator; a superheater that transfers waste heat from the internal combustion engine to a gas-phase refrigerant supplied from the gas-liquid separator; an expander driven by a refrigerant supplied from the superheater; a condenser that condenses a refrigerant supplied from the expander; and a second pump that supplies a refrigerant from the condenser to the gas-liquid separator.

PRIOR ART DOCUMENT

Patent Document

[Patent Document 1] Japanese Unexamined Patent Application Publication No. 2010-223116
[Patent Document 2] Japanese Unexamined Patent Application Publication No. 2008-169760

SUMMARY OF THE INVENTION

Problems to be Solved by the Invention

For example, in some cases, a liquid-phase refrigerant having a relatively low temperature is supplied to the gas-liquid separator from the internal combustion engine, and a gas-phase refrigerant is supplied to the gas-liquid separator from the steam generator. Therefore, the liquid-phase refrigerant might contact with the gas-phase refrigerant in the gas-liquid separator, so the gas-phase refrigerant might condense and disappear. In this case, the supply amount of the gas-phase refrigerant from the gas-liquid separator to the superheater and the expander might be reduced. This might reduce the recovery efficiency of the waste heat from the internal combustion engine.

The present invention has an object to provide a rankine cycle system that suppresses a decrease in a recovery efficiency of waste heat from an internal combustion engine is suppressed.

Means for Solving the Problems

The above object is achieved by a rankine cycle system including: an internal combustion engine cooled by a refrigerant circulating through the internal combustion engine; a gas-liquid separator; a first pump that supplies a refrigerant from the internal combustion engine to the gas-liquid separator, and supplies a liquid-phase refrigerant from the gas-liquid separator to the internal combustion engine again; a steam generator that transfers waste heat from the internal combustion engine to a liquid-phase refrigerant supplied from the gas-liquid separator, and supplies a refrigerant to the gas-liquid separator; a superheater that transfers waste heat from the internal combustion engine to a gas-phase refrigerant supplied from the gas-liquid separator; an expander driven by a refrigerant supplied from the superheater; a condenser that condenses a refrigerant supplied from the expander; a second pump that supplies a refrigerant from the condenser to the gas-liquid separator; a first control valve that controls a flow rate of a refrigerant from the internal combustion engine to the gas-liquid separator; and a controller that controls the first control valve to be close to a closing side, when a temperature of a refrigerant is low in the internal combustion engine, as compared with when a temperature of a refrigerant is high in the internal combustion engine.

When the temperature of the refrigerant is low in the internal combustion engine, as compared with when the temperature of the refrigerant is high in the internal combustion engine, the first control valve is controlled to be positioned close to the closing side. This can suppress a relatively low temperature refrigerant from being supplied to the gas-liquid separation from the internal combustion engine, and suppress the condensation of the gas-phase refrigerant supplied to the gas-liquid separator from the steam generator. It is thus possible to suppress a decrease in the supply amount of the gas-phase refrigerant from the gas-liquid separator to the superheater and the expander, and it is possible to suppress a decrease in the recovery efficiency of the waste heat from the internal combustion engine.

The controller may control the first control valve to be close to a closing side when a temperature of a refrigerant in the internal combustion engine is a first predetermined value or less, and may control the first control valve to be close to an opening side when a temperature of a refrigerant in the internal combustion engine is higher than the first predetermined value.

A second valve provided between the gas-liquid separator and the superheater may be included, wherein the controller may close the second valve when a temperature of a refrigerant in the internal combustion engine is the first predetermined value or less and when a temperature of a refrigerant in the gas-liquid separator is the second predetermined value or less, and may open the second valve when a temperature of a refrigerant in the steam generator is higher than the second predetermined value or when a temperature of a refrigerant in the internal combustion engine is higher than the first predetermined value.

The above object is also achieved by a rankine cycle system including: an internal combustion engine cooled by a refrigerant circulating through the internal combustion engine; a gas-liquid separator; a first pump that supplies a refrigerant from the internal combustion engine to the gas-liquid separator, and supplies a liquid-phase refrigerant from the gas-liquid separator to the internal combustion engine again; a steam generator that transfers waste heat from the internal combustion engine to a liquid-phase refrigerant supplied from the gas-liquid separator, and supplies a refrigerant to the gas-liquid separator; a superheater that transfers waste heat from the internal combustion engine to a gas-phase refrigerant supplied from the gas-liquid separator; an expander driven by a refrigerant supplied from the superheater; a condenser that condenses a refrigerant supplied from the expander; a second pump that supplies a refrigerant from the condenser to the gas-liquid separator; a first path through which a liquid-phase refrigerant is capable of flowing from the gas-liquid separator; a second path through which a liquid-phase refrigerant is capable of flowing from the internal combustion engine; a third path that is capable of supplying a liquid-phase refrigerant to the internal combustion engine; and a thermostat that is provided at a junction point of the first, second, and third paths, closes the first path and communicates between the second and third paths when a temperature of a liquid-phase refrigerant supplied from the second path is lower than a predetermined value, and closes the second path and communicates between the first and third paths when a temperature of a liquid-phase refrigerant supplied from the second path is higher than the predetermined value.

The thermostat closes the first path and communicates between the second and third paths, when the temperature of the liquid-phase refrigerant supplied from the second path is lower than a predetermined value. This can suppress a relatively low temperature refrigerant from being supplied to the gas-liquid separation from the internal combustion engine, and suppress the condensation of the gas-phase refrigerant supplied from the steam generator to the gas-liquid separator. It is thus possible to suppress a decrease in the supply amount of the gas-phase refrigerant from the gas-liquid separator to the superheater and the expander, and it is possible to suppress a decrease in the recovery efficiency of the waste heat from the internal combustion engine.

Effects of the Invention

It is possible to provide a rankine cycle system in which decrease in the recovery efficiency of the waste heat is suppressed.

MODES FOR CARRYING OUT THE INVENTION

Figure 1:
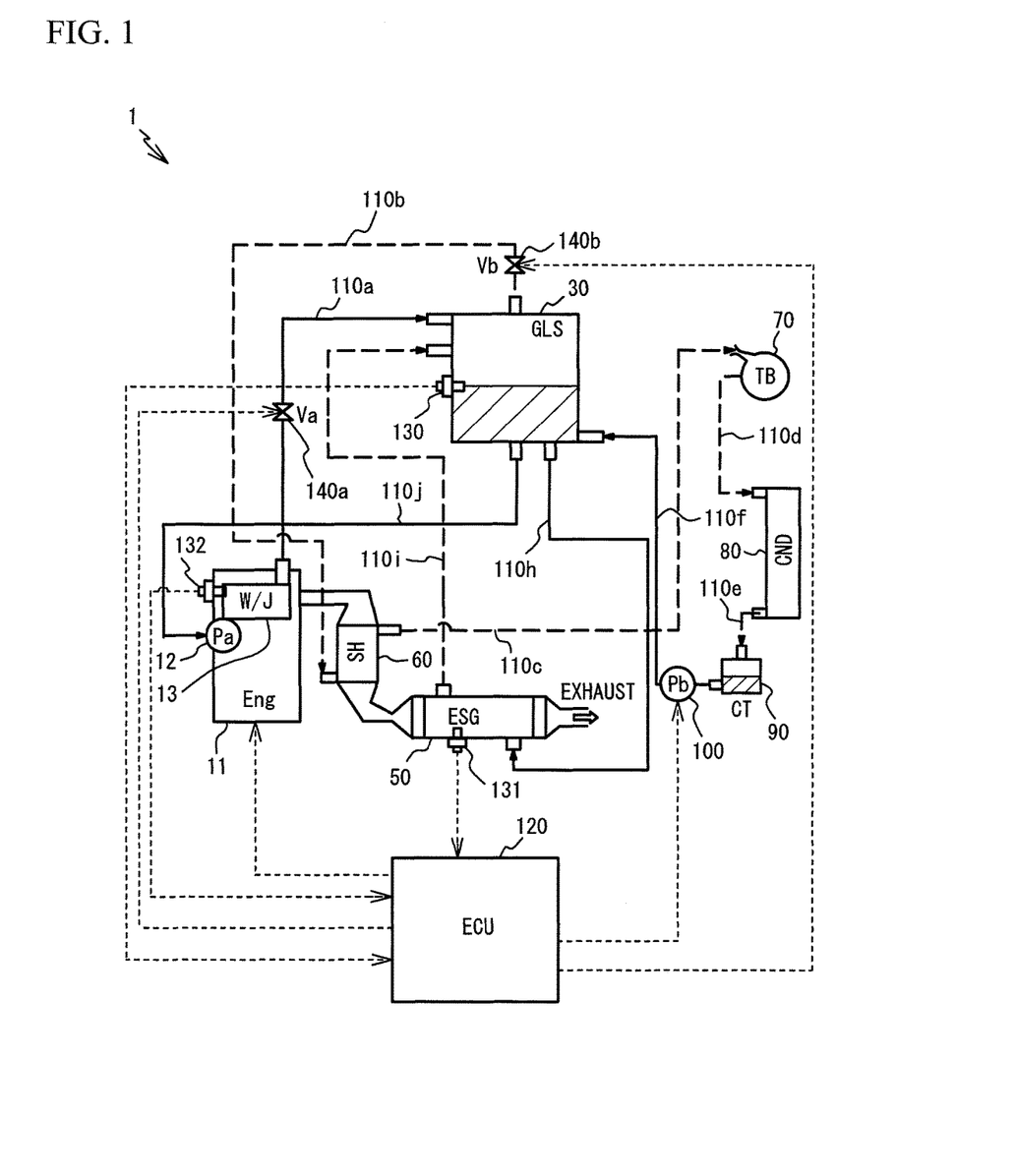
FIG. 1 is a schematic view of a rankine cycle system according to an embodiment.

A description will be given of a rankine cycle system (hereinafter, referred to as system) 1 according to an embodiment of the present invention. FIG. 1 is a schematic view of the system 1. The system 1 is mounted on a vehicle. The system 1 utilizes a refrigerant to cool an engine 11. A water jacket 13 (W/J) is provided in the engine 11. A pump 12 pumps the refrigerant to the water jacket 13. The pump 12 may be a mechanical type driven by drive force of the crankshaft in the engine 11, or an electric water pump driven by a motor. In this embodiment, the pump 12 is a mechanical water pump as an example. In this case, the pump 12 starts pumping the refrigerant, when the engine 11 starts. The pump 12 is an example of a first pump.

The liquid-phase refrigerant pumped from the pump 12 is discharged from the engine 11 through the water jacket 13. The refrigerant may be boiled by the heat from the engine 11, when flowing through the water jacket 13. The refrigerant further absorbs the heat of the engine 11 as latent heat in this boiling. The engine 11 is cooled in this manner. The refrigerant used in the present embodiment includes ethylene glycol and water, but is not limited to this.

The system 1 includes, a gas-liquid separator 30 (GLS), a steam generator 50 (ESG), a superheater 60 (SH), a turbine 70 (TB), a condenser 80 (CND), a catch tank 90 (CT), a pump 100 (Pb), various paths through which the refrigerant passes, and an ECU 120.

A path 110a communicates between a discharge port of the engine 11 and a supply port of the gas-liquid separator 30. A path 110b communicates between a discharge port of the gas-liquid separator 30 and a supply port of the superheater 60. A path 110c communicates between a discharge port of the superheater 60 and a supply port of the turbine 70. A path 110d communicates between a discharge port of the turbine 70 and a supply port of the condenser 80. A path 110e communicates between a discharge port of the condenser 80 and a supply port of the catch tank 90. A path 110f communicates between a discharge port of the catch tank 90 and a supply port of the gas-liquid separator 30. A path 110h communicates between a discharge port of the gas-liquid separator 30 and a supply port of the steam generator 50. A path 110i communicates between a discharge port of the steam generator 50 and a supply port of the gas-liquid separator 30. A path 110j communicates between a discharge port of the gas-liquid separator 30 and a supply port of the pump 12.

The path 110b is connected to the gas-liquid separator 30 above a liquid level of the liquid-phase refrigerant therein and is capable of supplying the gas-phase refrigerant from the gas-liquid separator 30 to the superheater 60. The paths 110h and 110j are connected to the gas-liquid separator 30 below the liquid level of the liquid-phase refrigerant therein and is capable of supplying the liquid-phase refrigerant from the gas-liquid separator 30 to the engine 11 and the steam generator 50. The path 110i is connected to the gas-liquid separator 30 above the liquid level of the liquid-phase refrigerant therein and is capable of supplying the gas-phase refrigerant generated by the steam generator 50 to the gas-liquid separator 30.

A liquid level sensor 130 detects the liquid level of the liquid-phase refrigerant in the gas-liquid separator 30. A temperature sensor 131 provided in the steam generator 50 detects the temperature of the liquid-phase refrigerant therein. A temperature sensor 132 provided in the engine 11 detects the temperature of the liquid-phase refrigerant in the water jacket 13. These sensor output detection results to the ECU 120. Also, the temperature sensor 132 may be provided near the discharge port of the water jacket 13 communicating with the path 110a or may be provided on the path 110a.

Control valves 140a (Va) and 140b (Vb) open and close the respective paths 110a and 110b based on instructions from the ECU 120. The path 110a communicates between the water jacket 13 of the engine 11 and the gas-liquid separator 30. The control valve 140a is an example of a first valve controlling the flow rate of the refrigerant supplied from the engine 11 to the gas-liquid separator 30. The path 110b communicates between the gas-liquid separator 30 and the superheater 60. The control valve 140b is an example of a second control valve controlling the flow rate of the gas-phase refrigerant supplied from the gas-liquid separator 30 to the superheater 60.

As illustrated in FIG. 1, the refrigerant discharged from the water jacket 13 of the engine 11 is supplied to the gas-liquid separator 30 through the path 110a. The refrigerant discharged from the water jacket 13 includes the liquid-phase refrigerant and the gas-phase refrigerant, as depending of the refrigerant temperature. For example, when the temperature of the engine 11 is low and the refrigerant temperature is low, the liquid-phase refrigerant is supplied to the gas-liquid separator 30. When the temperature of the engine 11 is high, the liquid-phase refrigerant and the gas-phase refrigerant are supplied to the gas-liquid separator 30. The gas-liquid separator 30 separates the supplied refrigerant into the liquid-phase refrigerant and the gas-phase refrigerant.

The gas-phase refrigerant in the gas-liquid separator 30 is supplied to the superheater 60 through the path 110b, when the control valve 140b is opened. In the superheater 60, the refrigerant is heated with the waste heat from the engine 11 so as to be heating steam. In this embodiment, the exhaust heat of the exhaust path of the engine 11 is used as an example of the waste heat from the engine 11. The superheater 60 is provided on the upstream side of the steam generator 50 in the exhaust path of the engine 11.

The refrigerant heated by the superheater 60 is changed into heating steam, and the heating steam is supplied to the turbine 70 through the path 110c. The turbine 70 is rotated by the supplied heating steam. The turbine 70 is connected to a generator not illustrated. The rotation of the turbine 70 causes the generator to generate electricity. In this way, the system 1 according to the present embodiment recovers the waste heat of the engine 11 as power of the generator. Further, the refrigerant of the heating steam expands in accordance with the rotation of the turbine 70. Accordingly, the turbine 70 functions as an expander in the system 1.

The gas-phase refrigerant discharged from the turbine 70 is supplied to the condenser 80 through the path 110d. The condenser 80 is that is a so-called condenser that generates the liquid-phase refrigerant by condensing the gas-phase refrigerant. The liquid-phase refrigerant discharged from the condenser 80 is supplied to the catch tank 90 through the path 110e. The catch tank 90 temporarily stores the refrigerant discharged from the condenser 80. The pump 100 is driven based on instructions from the ECU 120. The driving of the pump 100 disposed in the path 110f causes the refrigerant to be supplied from the catch tank 90 to the gas-liquid separator 30 through the path 110f. Additionally, the pump 100 is, for example, a motorized displacement water pump, but not limited thereto. The pump 100 is an example of a second pump.

The liquid-phase refrigerant in the gas-liquid separator 30 is supplied to the steam generator 50 through the path 110h. The steam generator 50 changes the liquid-phase refrigerant into the steam by heating the liquid-phase refrigerant with the waste heat from the engine 11, and discharges the steam. In this embodiment, the exhaust heat of the exhaust path of the engine 11 is used as an example of the waste heat of the engine 11.

The refrigerant discharged from the steam generator 50 is supplied to the gas-liquid separator 30 through the path 110i. The liquid-phase refrigerant stored in the gas-liquid separator 30 is supplied to the pump 12 through the path 110j and is supplied to the water jacket 13 of the engine 11.

The gas-liquid separator 30 is located higher than the steam generator 50 in the gravity direction. Therefore, the liquid-phase refrigerant stored in the gas-liquid separator 30 is supplied to the steam generator 50 through the path 110h, generally due to gravity.

The ECU 120 controls the control valves 140a, and 140b to open and close the paths 110a and 110b. As will be described later, the ECU 120 controls the opening degree of the control valve 140a on the basis of the temperature of the refrigerant in the engine 11. The ECU 120 controls the opening degree of the control valve 140b based on the temperature of the refrigerant in the steam generator 50. The ECU 120 also controls the pump 100. Further, the ECU 120 controls the drive state of the engine 11 by controlling the fuel injection amount and the fuel injection timing of the engine 11 and the like. The ECU 120 includes a CPU (Central Processing Unit), a ROM (Read Only Memory), and a RAM (Random Access Memory).

Figure 2:
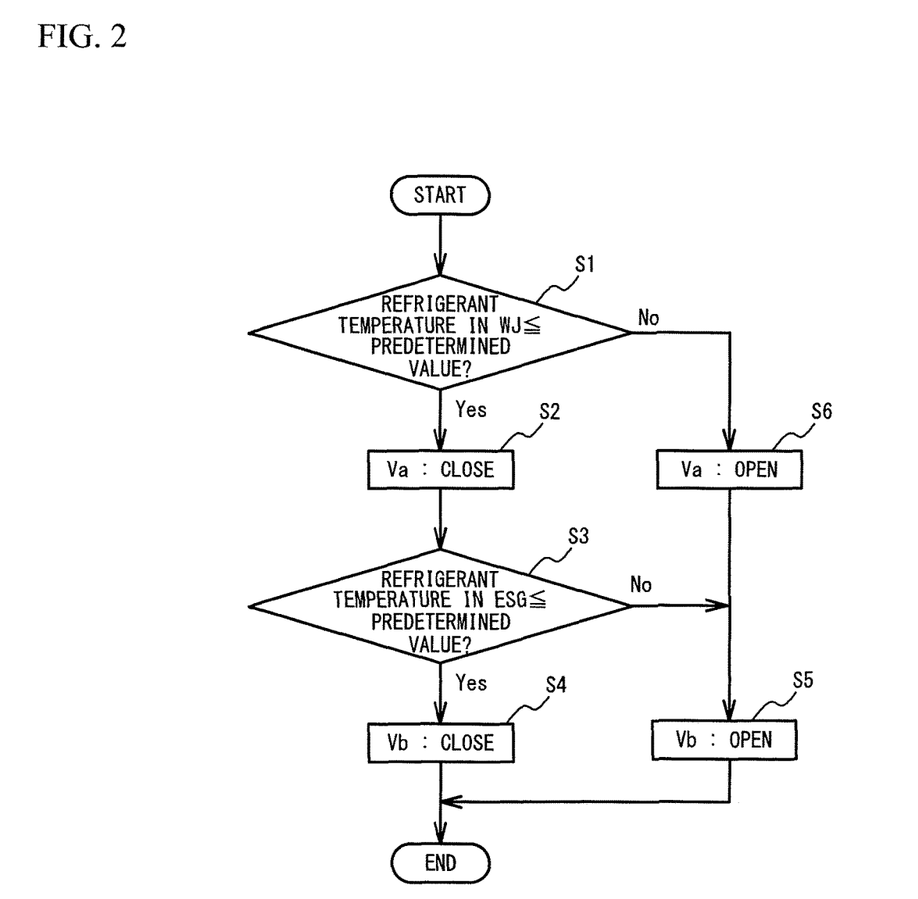
FIG. 2 is a flowchart illustrating an example of control executed by an ECU after an engine starts.

A description will be given of the control executed by the ECU 120 with reference to a flowchart. FIG. 2 is a flowchart illustrating an example of the control executed by the ECU 120 after the engine 11 starts. Additionally, at the start point of FIG. 2, the control valves 140a and 140b are opened, and the gas-liquid separator 30 stores a predetermined amount of the liquid-phase refrigerant.

The ECU 120 determines whether or not the temperature of the refrigerant in the water jacket 13 obtained based on the detection result of the temperature sensor 132 is a predetermined value or less (step S1). A predetermined value in step S1 is the refrigerant temperature capable of driving the turbine 70 when the refrigerant is supplied thereto through the gas-liquid separator 30 and the superheater 60. For example, a predetermined value is 80 degrees Celsius. This predetermined value is previously stored in the ROM of the ECU 120. A predetermined value is an example of a first predetermined value. Additionally, in a case of YES in step S1, the warm-up of the engine 11 is not finished, that is, the warm-up is kept. In a case of No in step S1, the warm-up of the engine 11 is finished.

In a case of Yes in step S1, the ECU 120 closes the control valve 140a (step S2). Thus, the low-temperature refrigerant stops being supplied to the gas-liquid separator 30.

Next, the ECU 120 determines whether or not the temperature of the refrigerant in the steam generator 50 obtained based on the detection result of the temperature sensor 131 is lower than a predetermined value (step S3). A predetermined value in step S3 is the refrigerant temperature capable of driving the turbine 70 when the refrigerant is supplied thereto through the gas-liquid separator 30 and the superheater 60. For example, a predetermined value is 80 degrees Celsius. This predetermined value is previously stored in the ROM of the ECU 120. A predetermined value is an example of a second predetermined value. Additionally, in a case of YES in step S3, the warm-up of the system 1 is not finished. In a case of No in step S3, the warm-up of the system 1 is finished.

In a case of Yes in step S3, the ECU 120 closes the control valve 140b (step S4). Thus, the refrigerant stops being supplied to the superheater 60. In this case, the turbine 70 is not driven. Further, the closing of both control valves 140a and 140b causes the refrigerant to circulate between the gas-liquid separator 30 and the steam generator 50. The process in step S4 executes until No is determined in step S3, that is, until the temperature of the refrigerant in the steam generator 50 is higher than a predetermined value.

In a case of No in step S3, the ECU 120 opens the control valve 140b (step S5). Therefore, the gas-phase refrigerant in the gas-liquid separator 30 is supplied to the superheater 60 to generate the heated steam by the superheater 60, which supplies the heated steam to the turbine 70. This drives the turbine 70. Further, the opening of the control valve 140b reduces the internal pressure of the gas-liquid separator 30. This also reduces the internal pressure of the steam generator 50 communicating with the gas-liquid separator 30 through the path 110i. This facilitates the boiling of the refrigerant in the steam generator 50.

In a case of No in step S3, the ECU 120 opens the control valve 140a (step S6) and also open the control valve 140b (step S5). Accordingly, the refrigerant discharged from the engine 11 is supplied to the gas-liquid separator 30, which supplies the refrigerant discharged from the gas-liquid separator 30 to the superheater 60. Therefore, the superheater 60 generates the heated steam, and the heated steam is supplied to the turbine 70, which drives the turbine 70.

As described above, when the refrigerant temperatures in the water jacket 13 and the steam generator 50 are determined to be the respective predetermined value or less in steps S1 and S3, the control valves 140a and 140b are closed. The case where the refrigerant temperatures are determined to the respective predetermined values or less in steps S1 and S3 is, for example, just after the engine 11 starts in the cold state. In this case, the refrigerant in the gas-liquid separator 30 circulates between the gas-liquid separator 30 and the steam generator 50, and the gas-phase refrigerant is prohibited from being supplied to the superheater 60 and the turbine 70 until the temperature of the refrigerant discharged from the steam generator 50 is higher than a predetermined value.

When the temperature of the refrigerant in the water jacket 13 is determined to be a predetermined value or less in step S1, and even when the temperature of the refrigerant in the steam generator 50 is determined to be higher than a predetermined value in step S3, the control valve 140a is closed and the control valve 140b is opened. Accordingly, even when the temperature of the refrigerant in the water jacket 13 is low, and when the refrigerant in the steam generator 50 is higher than a predetermined value, the gas-phase refrigerant generated by the steam generator 50 is supplied to the turbine 70 through the gas-liquid separator 30 and the superheater 60, thereby driving the turbine 70. Thus, even when the engine 11 is still in the cold state, and when the temperature of the refrigerant in the steam generator 50 is relatively high, the liquid-phase refrigerant generated in the steam generator 50 is immediately supplied to the turbine 70, thereby operating the system 1.

When the temperature of the refrigerant in the water jacket 13 is determined to be higher than a predetermined value in step S1, the control valves 140a and 140b are opened to supply the refrigerant from the water jacket 13 to the gas-liquid separator 30, which supplies the gas-phase refrigerant from the gas-liquid separator 30 to the superheater 60 and the turbine 70. Also, in this case, even when the temperature of the refrigerant in the steam generator 50 is a predetermined value or less, the control valve 140b is opened. The case where the temperature of the refrigerant in the water jacket 13 is higher than a predetermined value means the case where the engine 11 is brought into the warm state. When the engine 11 is brought into the warm state, the gas-phase refrigerant in the gas-liquid separator 30 is supplied to the turbine 70, regardless of a temperature of the refrigerant in the steam generator 50. This can drive the turbine 70 as soon as the engine 11 is brought into the warm state.

In the present embodiment, the low-temperature refrigerant in the water jacket 13 is prohibited from being supplied to the gas-liquid separator 30. This can suppress the condensation of the gas-phase refrigerant supplied from the steam generator 50 to the gas-liquid separator 30, thereby driving the turbine 70 immediately by using the gas-phase refrigerant. Thus, even in the cold start at which the refrigerant temperature is low, it is possible to operate the system 1 immediately, thereby suppressing the decrease in the recovery efficiency of the waste heat from the engine 11 and suppressing the decrease in the fuel efficiency.

Additionally, since the heat capacity of the engine 11 is relatively large at the time of the cold start, it takes time for the engine 11 to heat up, so it takes relatively long time for the temperature of the refrigerant in the water jacket 13 to be higher than a predetermined value. In contrast, a heat source of the steam generator 50 is the exhaust heat the temperature of which is made immediately high even after the engine 11 starts in the cold state, and a heat capacity of the steam generator 50 is relatively small. Therefore, it doesn't take time for the steam generator 50 to reach a high temperature, and it takes relatively short time for the temperature of the refrigerant in the steam generator 50 to be higher than a predetermined value. Thus, in some cases, the temperature of the refrigerant in the steam generator 50 is higher than a predetermined value, before the temperature of the refrigerant in the water jacket 13 is higher than a predetermined value. In the present embodiment, the system 1 can be immediately operated by utilizing the gas-phase refrigerant discharged from such a steam generator 50 that immediately reaches a high temperature.

In addition, the opening degree of the control valve 140a may be controlled based on the temperature of the refrigerant in the water jacket 13. For example, the ECU 120 may control the opening degree of the control valve 140a to be greater toward the opening side as the temperature of the refrigerant in the water jacket 13 is higher, and may control the opening degree of the control valve 140a to be smaller toward the closing side as the temperature of the refrigerant in the water jacket 13 is lower. In this case, it is also possible to suppress the flow rate of the liquid-phase refrigerant supplied to the gas-liquid separator 30 when the temperature of the refrigerant in the water jacket 13 is low, thereby suppressing the gas-phase refrigerant generated in the steam generator 50 from condensing in the gas-liquid separator 30.

In the above example, first and second predetermined values of the opening and closing conditions for the respective control valves 140a and 140b are the same, but may be different.

Figure 3:
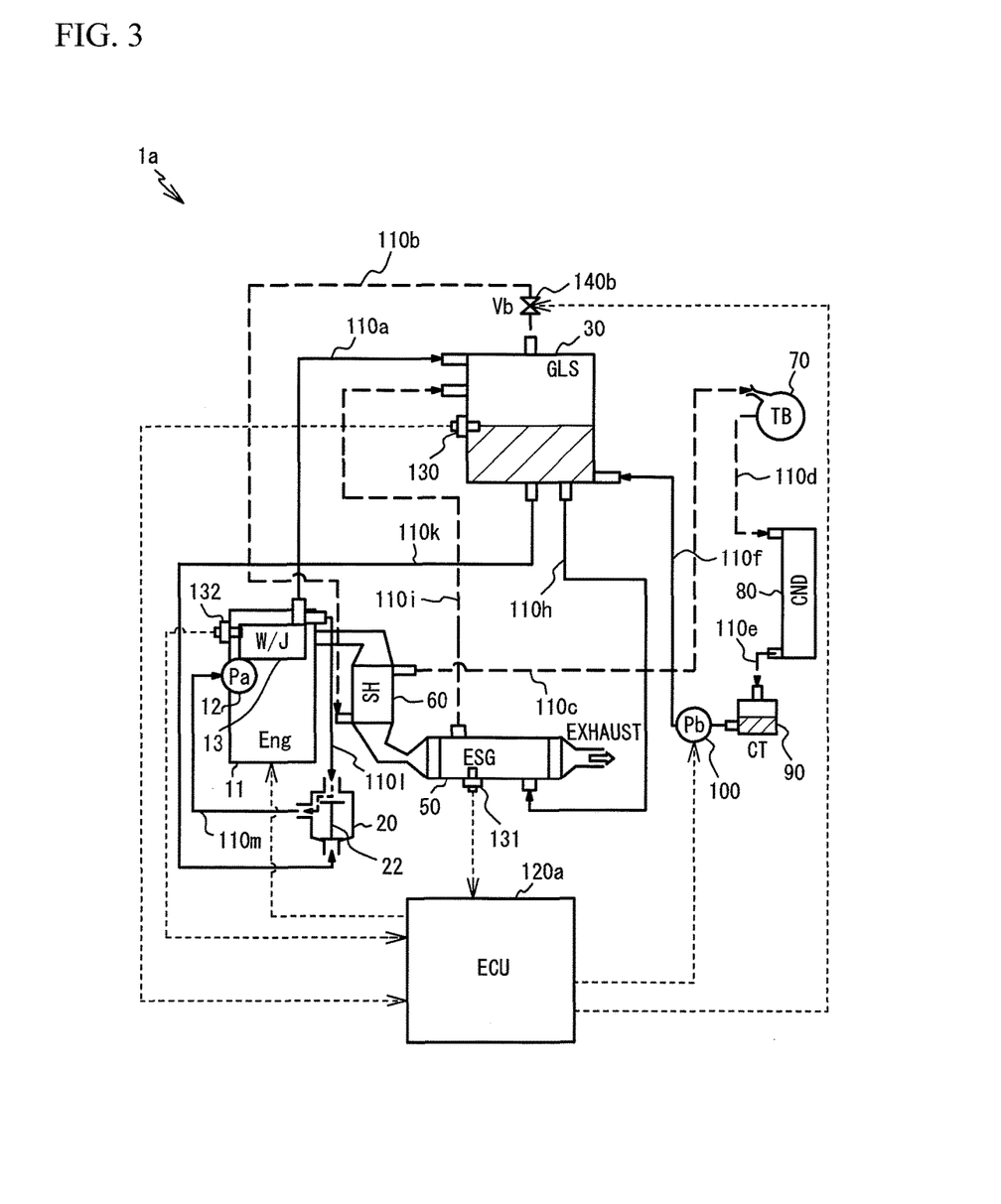
FIG. 3 is a schematic view of a rankine cycle system according to a variation.
Figure 4:
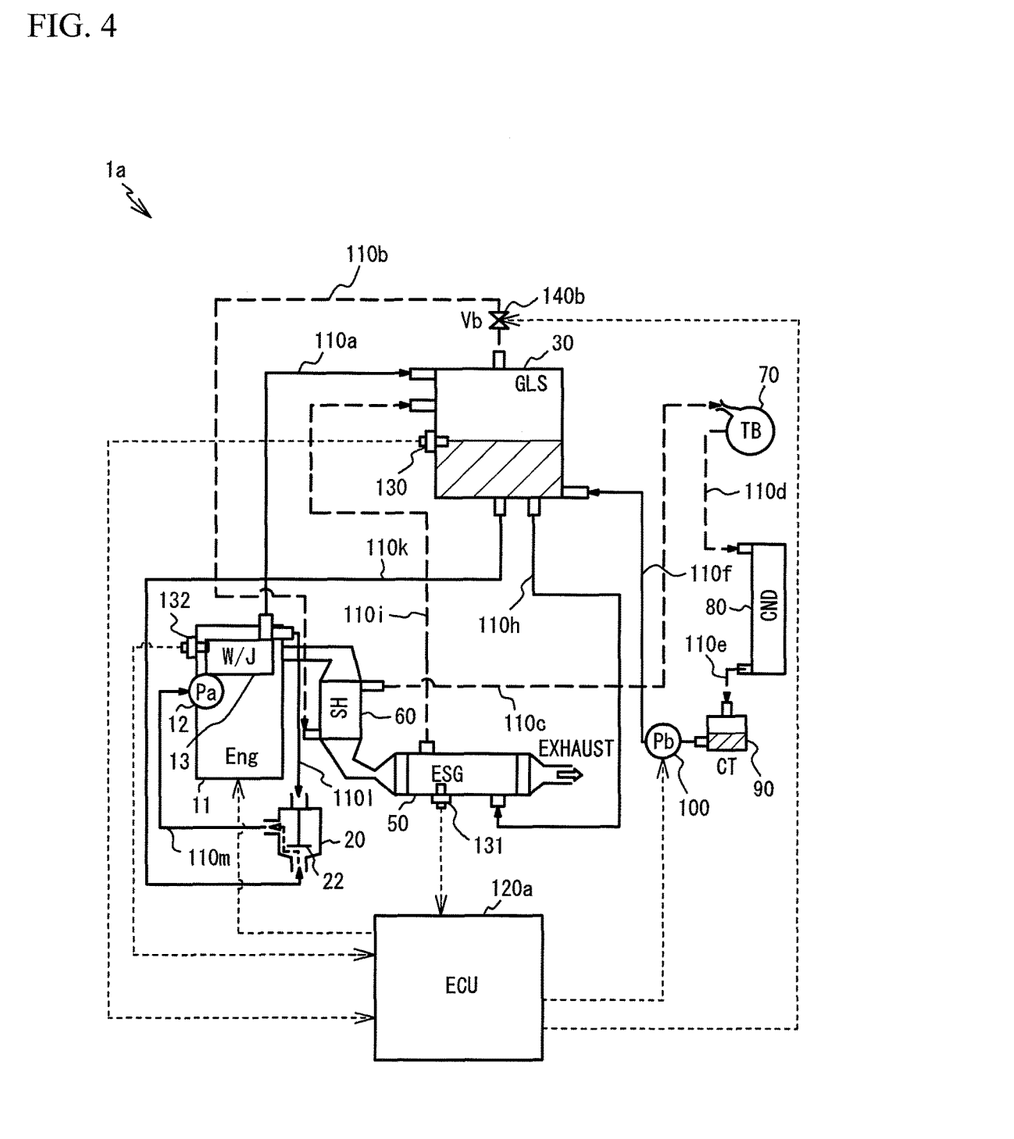
FIG. 4 is a schematic view of a rankine cycle system according to a variation.

Next, a rankine cycle system 1a according to a variation will be described. Additionally, as for the rankine cycle system 1a, same components and similar components are denoted by the same and similar numeral references, and a duplicate description is omitted. FIGS. 3 and 4 are schematic views illustrating an overall configuration of the system 1a.

The system 1a includes a thermostat 20 without including the control valve 140a. A path 110k communicates between the discharge port of the gas-liquid separator 30 and the first supply port of the thermostat 20. The path 110k enables the liquid-phase refrigerant to flow therethrough from the gas-liquid separator 30. A path 110l communicates between the discharge port of the engine 11 and the second supply port of the thermostat 20. The path 110l enables the liquid-phase refrigerant to flow therethrough from the engine 11. A path 110m communicates between a discharge port of the thermostat 20 and a supply port of the pump 12. The path 110m enables the liquid-phase refrigerant to be supplied to the engine 11. The thermostat 20 is located at the junction of the paths 110k, 110l, and 110m.

The thermostat 20 is provided with a valve body 22. When the temperature of the refrigerant flowing through the thermostat 20 is a predetermined value or less, the valve body 22 communicates between the paths 110l and 110m and closes the path 110k. When the temperature of the refrigerant flowing through the thermostat 20 is higher than a predetermined value, the valve body 22 closes the path 110l and communicates between the path 110k and 110m. Therefore, when the path 110k is closed, the refrigerant is prohibited from being supplied from the gas-liquid separator 30 to the engine 11. When the paths 110k and 110m are communicated, the refrigerant is supplied from the gas-liquid separator 30 to the engine 11. FIG. 3 illustrates the state where the paths 110l and 110m are communicated and the path 110k is closed. FIG. 4 illustrates the state where the paths 110k and 110m are communicated and the path 110l is closed.

Figure 5:
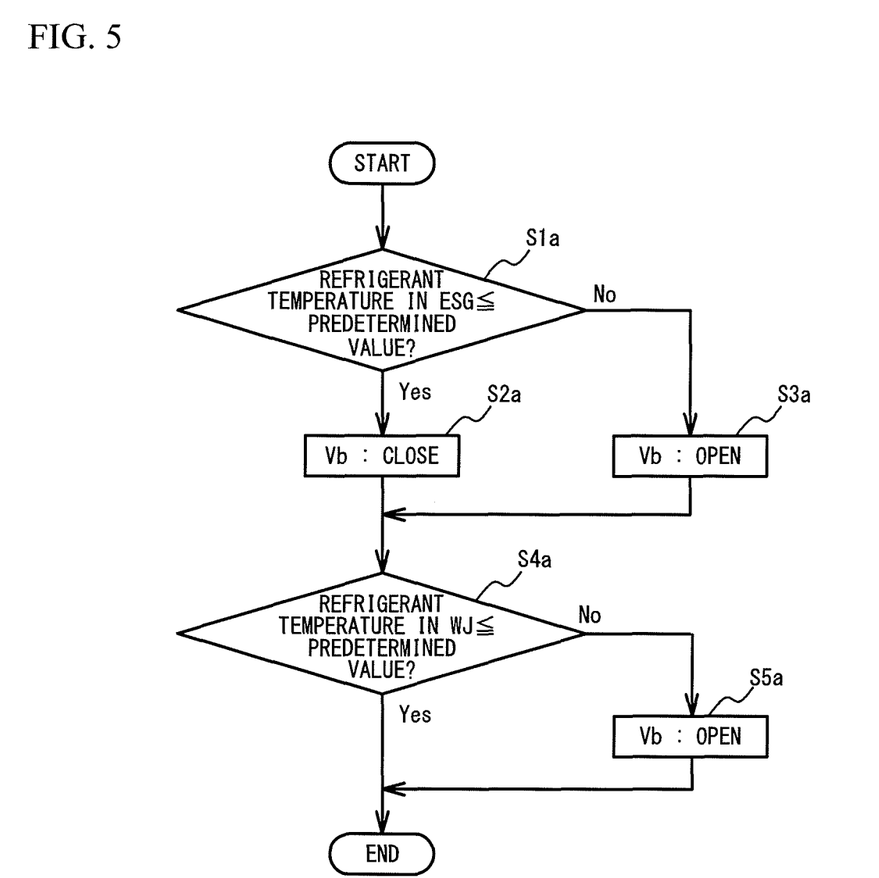
FIG. 5 is a flowchart illustrating an example of control executed by an ECU after an engine starts.

A description will be given of the control of the system 1a by an ECU 120a with reference to a flowchart. FIG. 5 is a flowchart illustrating an example of the control executed by the ECU 120a after the engine 11 starts. The ECU 120a determines whether or not the temperature of the refrigerant in the steam generator 50, obtained based on the detection results of the temperature sensor 131, is a predetermined value or less (step S1a). A predetermined value is, for example, 80 degrees Celsius.

When the determination is Yes in step S1a, the ECU 120a closes the control valve 140b (step S2a). When the control valve 140b is closed in step S2a, the refrigerant stops being supplied to the superheater 60. When the determination is No in step S1a, the ECU 120 opens the control valve 140b (step S3a). Thus, the refrigerant discharged from the gas-liquid separator 30 is supplied to the superheater 60.

The ECU 120a determines whether or not the temperature of the refrigerant discharged from the water jacket 13, obtained based on the detection result of the temperature sensor 132, is a predetermined value or less (step S4a). When the determination is Yes in step S4a, the valve body 22 of the thermostat 20 communicates the paths 110l and 110m and closes the path 110k as illustrated in FIG. 3, because of a low temperature of the refrigerant supplied from the water jacket 13 to the thermostat 20. Thus, when the temperature of the refrigerant in the water jacket 13 is a predetermined value or less, the refrigerant passing through the water jacket 13 circulates in the water jacket 13 through the paths 110l and 110m. Here, the path 110a connected to the water jacket 13 extends vertically above the engine 11, whereas the path 110l extends downwardly from the engine 11. Therefore, when the paths 110l and 110m are communicated, the refrigerant flows through the path 110l before flowing from the water jacket 13 to the path 110a.

When the determination is No in step S4a, the temperature of the valve body 22 is increased by supplying the refrigerant having a relatively high temperature to the thermostat 20 from the water jacket 13, so that the valve body 22 closes the path 110l and communicates between the paths 110k and 110m as illustrated in FIG. 4. Thus, the refrigerant is prohibited from circulating through the paths 110l and 110m and is supplied to the gas-liquid separator 30 from the water jacket 13. In addition, when the determination is No in step S4a, the ECU 120a opens the control valve 140b (step S5a). Thus, the refrigerant discharged from the gas-liquid separator 30 is supplied to the superheater 60.

As described above, when the temperature of the refrigerant in the water jacket 13 is relatively low, the refrigerant circulates in the engine 11 through the path 110l, the thermostat 20, and the path 110m. It is therefore possible to suppress the liquid-phase refrigerant having a low temperature from being supplied to the gas-liquid separator 30 from the water jacket 13, when the gas-phase refrigerant is supplied from the steam generator 50 to the gas-liquid separator 30. It is thus possible to suppress the gas-phase refrigerant generated in the steam generator 50 from condensing in the gas-liquid separator 30 due to the refrigerant having a low temperature supplied from the water jacket 13, thereby suppressing a decrease in the recovery efficiency of the waste heat from the engine 11.

When the temperature of the refrigerant in the water jacket 13 is relatively high, the path 110l is closed to suppress the refrigerant from circulating through the paths 110l and 110m, and the refrigerant is supplied to the water jacket 13 from the gas-liquid separator 30. In this way, the path 110l is closed, which supplies the refrigerant having a temperature higher than a predetermined value to the gas-liquid separator 30 from the water jacket 13.

While the exemplary embodiments of the present invention have been illustrated in detail, the present invention is not limited to the above-mentioned embodiments, and other embodiments, variations and variations may be made without departing from the scope of the present invention.

DESCRIPTION OF LETTERS OR NUMERALS 1 rankine cycle system
11 internal combustion engine
13 water jacket
20 thermostat
30 gas-liquid separator
50 steam generator
60 superheater
70 turbine
80 condenser
110k, 110l, 110m path
120 ECU

The invention claimed is:
1. A rankine cycle system comprising:
an internal combustion engine cooled by a refrigerant circulating through the internal combustion engine;
a gas-liquid separator;
a first pump that supplies a refrigerant from the internal combustion engine to the gas-liquid separator, and supplies a liquid-phase refrigerant from the gas-liquid separator to the internal combustion engine again;
a steam generator that transfers waste heat from the internal combustion engine to the liquid-phase refrigerant supplied from the gas-liquid separator, and supplies a refrigerant to the gas-liquid separator;
a superheater that transfers waste heat from the internal combustion engine to a gas-phase refrigerant supplied from the gas-liquid separator;
an expander driven by a refrigerant supplied from the superheater;
a condenser that condenses a refrigerant supplied from the expander;
a second pump that supplies a refrigerant from the condenser to the gas-liquid separator;
a first control valve that controls a flow rate of a refrigerant from the internal combustion engine to the gas-liquid separator;

a controller that controls the first control valve to be nearer to a closing side than an opening side when a temperature of a refrigerant in the internal combustion engine is a first predetermined value or less, and controls the first control valve to be nearer to the opening side than the closing side when a temperature of a refrigerant in the internal combustion engine is higher than the first predetermined value; and a second valve provided between the gas-liquid separator and the superheater, wherein the controller closes the second valve when a temperature of a refrigerant in the internal combustion engine is the first predetermined value or less and when a temperature of a refrigerant in the gas-liquid separator is a second predetermined value or less, and opens the second valve when a temperature of a refrigerant in the steam generator is higher than the second predetermined value or when a temperature of a refrigerant in the internal combustion engine is higher than the first predetermined value.

2. A rankine cycle system comprising:

an internal combustion engine cooled by a refrigerant circulating through the internal combustion engine;

a gas-liquid separator;

a first pump that supplies a refrigerant from the internal combustion engine to the gas-liquid separator, and supplies a liquid-phase refrigerant from the gas-liquid separator to the internal combustion engine again;

a steam generator that transfers waste heat from the internal combustion engine to the liquid-phase refrigerant supplied from the gas-liquid separator, and supplies a refrigerant to the gas-liquid separator;

a superheater that transfers waste heat from the internal combustion engine to a gas-phase refrigerant supplied from the gas-liquid separator;

an expander driven by a refrigerant supplied from the superheater;

a condenser that condenses a refrigerant supplied from the expander;

a second pump that supplies a refrigerant from the condenser to the gas-liquid separator;

a first path through which a liquid-phase refrigerant is capable of flowing from the gas-liquid separator;

a second path through which a liquid-phase refrigerant is capable of flowing from the internal combustion engine;

a third path that is capable of supplying a liquid-phase refrigerant to the internal combustion engine;

a thermostat that is provided at a junction point of the first, second, and third paths, closes the first path and communicates between the second and third paths when a temperature of a liquid-phase refrigerant supplied from the second path is lower than a first predetermined value, and closes the second path and communicates between the first and third paths when a temperature of a liquid-phase refrigerant supplied from the second path is higher than the first predetermined value; and a control valve provided between the gas-liquid separator and the superheater, wherein the control valve is closed when a temperature of a refrigerant in the steam generator is a second predetermined value or less, and the control valve is opened when a temperature of a refrigerant in the steam generator is higher than the second predetermined value and when a temperature of a refrigerant in the internal combustion engine is higher than the first predetermined value.

* * * * *